No. 838,949. PATENTED DEC. 18, 1906.
A. CHURCHWARD.
VAPOR RECTIFIER.
APPLICATION FILED APR. 19, 1905.
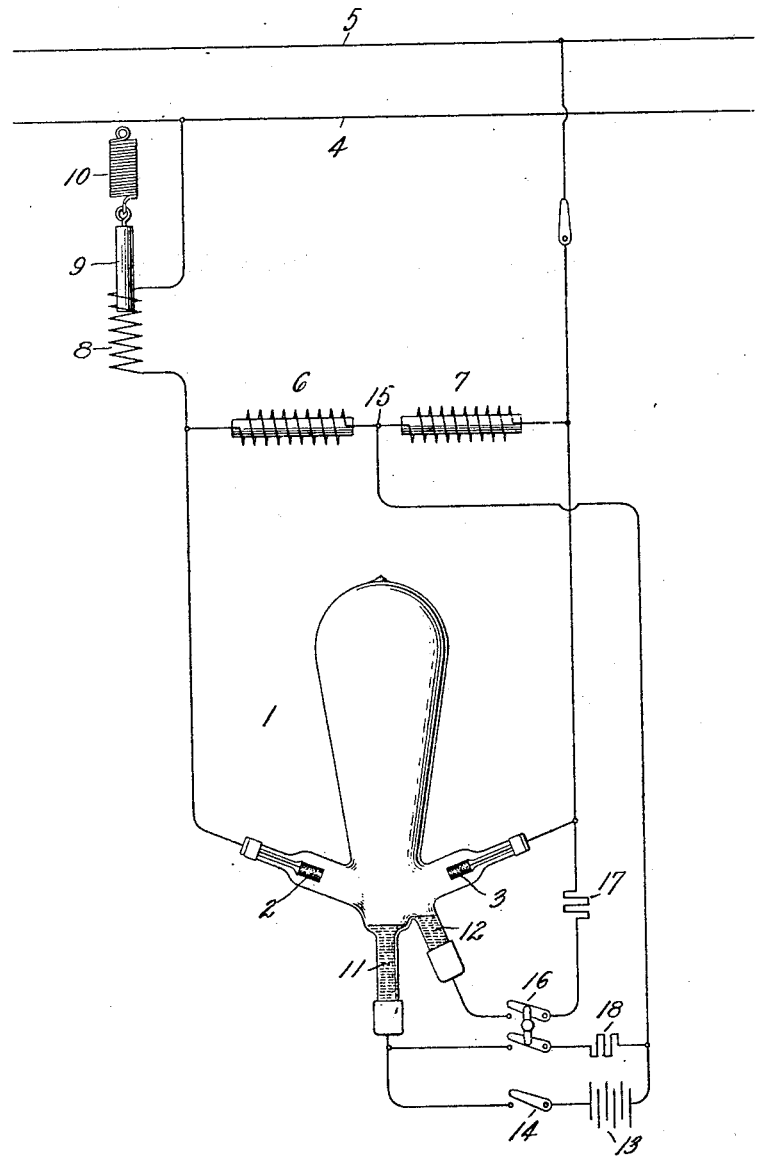
WITNESSES:
INVENTOR:
Alexander Churchward,
By Albert G. Davis
Att'y.

UNITED STATES PATENT OFFICE.

ALEXANDER CHURCHWARD, OF NEW YORK, N. Y., ASSIGNOR TO GENER ELECTRIC COMPANY, A CORPORATION OF NEW YORK.

VAPOR-RECTIFIER.

No. 838,949.  Specification of Letters Patent.  Patented Dec. 18, 190?

Application filed April 19, 1905. Serial No. 256,485.

*To all whom it may concern:*

Be it known that I, ALEXANDER CHURCHWARD, a citizen of the United States, residing at New York, county of New York, State of New York, have invented certain new and useful Improvements in Vapor-Rectifiers, of which the following is a specification.

The use of mercury rectifiers for producing unidirectional current of a voltage low enough to charge a storage battery consisting of only a few cells involves the difficulty that the rectifier will not readily start on an alternating voltage low enough to give the desired direct-current pressure at the load. Furthermore, a rectifier so connected cannot be readily started from the direct-current end, as the voltage of the few storage-cells is not sufficient to maintain a starting-arc in the rectifier-tube. To overcome this difficulty, I provide an automatic reactance device in series with one of the rectifier-leads, so that a relatively high voltage—as, for instance, one hundred and ten volts—may be impressed on the rectifier-anodes at starting, but whereby the rectifier-voltage is immediately cut down as soon as current begins to flow, so that the direct current delivered by the rectifier has a low pressure—as, for instance, eight volts—and is consequently suitable for charging a small number of storage-cells connected in series.

My improved system also includes means whereby the rectifier may be started on a resistance-load and whereby the battery m.., be subsequently substituted for the resistance, as I find that such an arrangement materially assists the starting operation.

In the drawing forming a part of this specification the mercury-rectifier tube 1 is provided with anodes 2 and 3, which are connected, respectively, to the mains 4 and 5 of an alternating-current circuit supplied with current at a commercial voltage and frequency. Two reactance-coils ( and 7 are connected in series across the anode connections, and a third reactance-coil 8 is connected in series with th.. ... .. .nd is The rectifier 1 is provided with a mei cathode 11 and an auxiliary or starting trode 12, also of mercury. The storage tery 13 to be charged is connected throu. switch 14 to the mercury cathode 11 an also connected to a tap 15, located betw the two reactance-coils 6 and 7. A dou pole switch 16 is provided by which starting-electrode 12 may be connec through a resistance 17 to the line conduc 5 and by which the mercury cathode 11 m be simultaneously connected through a r sistance 18 with the tap 15.

With the parts in the position shown in th drawings the starting operation is as follows Switch 16 is closed to impress a voltage be tween the mercury electrodes 11 and 12. after which the rectifier is shaken slightly to form a contact between these electrodes, thus permitting current to flow from electrode 12 to electrode 11 and then through re sistance 18 and reactance 6 to line conducto 4. When electrodes 11 and 12 separate, a incipient arc is formed between the two me cury surfaces and furnishes an excitation the cathode-surface, which enables a con panion arc to start from the anode 2. Tl reactance 6 discharges between electrodes and 11 the energy previously stored up there in by the flow of current from electrode 12. The action of reactance 6 and a similar action of reactance 7 keep the rectifier in a conduct ive condition by bridging over the small in .. ral of time in each cycle during which the current from the line conductors 4 and 5 is zero.

As soon as the flow of current takes place through the rectifier the reactive coil 8 draws down its armature 9, so that the direct-current voltage delivered by the rectifier is reduced to the desired magnitude. To substitute the load 13 for the resistance 18, the switch 14 is closed, thus connecting the storage battery in shunt with the resistance, after which the switch 16 is opened to cause all the direc.. .. ..    .put to pass through also to disc.. place le and connected to said source, means
r impressing the normal voltage of said
urce across said rectifier-anodes and before
e rectifier starts, and automatic means for
ecreasing the voltage on said rectifier when
rrent begins to flow therethrough.

2. In a system of electrical distribution,
source of alternating current, a vapor-recti-
having a plurality of anodes and a cath-
and connected across said source, a low-
ge storage battery supplied with cur-
from said rectifier, and a reactance de-
for automatically decreasing the voltage
ressed on said rectifier when current be-
to flow therethrough.

. In a system of electrical distribution, a
rce of alternating current, a vapor-recti-
connected to said source, means for using
· normal voltage of said source to start
d rectifier, and means operable by the flow
aid current for decreasing the voltage im-
essed on said rectifier.

4. In a system of electrical distribution, a
urce of alternating current, a vapor-recti-
er connected thereto, means for starting
aid rectifier, a reactance-coil traversed by
aid current, and automatic means for in-
creasing the reactive effect of said coil when
current flows through said rectifier.

5. In a system of electrical distribution, a
source of alternating current, a vapor-recti-
fier connected to said source, a low-voltage
load to be supplied with direct current from
said rectifier, means for utilizing the normal
voltage of said source to establish a flow of
current through said rectifier, and means op-
erated by the flow of current through said
rectifier for reducing the voltage of the direct
current supplied by said rectifier to a value
suitable for supplying said low-voltage load.

6. In a system of electrical distribution, a
source of alternating current, a vapor-recti-
fier connected to said source, means for util-
izing the normal voltage of said source to
start a flow of current through said rectifier,
a resistance-load for said rectifier at starting,
means for substituting a battery-load for the
resistance-load after the rectifier has started,
and means operated by the starting-current
of said rectifier for reducing the pressure im-
pressed thereon by said source of alternating
current.

In witness whereof I have hereunto set my
hand this 18th day of April, 1905.

ALEXANDER CHURCHWARD.

Witnesses:
BENJAMIN B. HULL,
HELEN ORFORD.